US008519963B2

(12) United States Patent
Kocienda et al.

(10) Patent No.: US 8,519,963 B2
(45) Date of Patent: Aug. 27, 2013

(54) PORTABLE MULTIFUNCTION DEVICE, METHOD, AND GRAPHICAL USER INTERFACE FOR INTERPRETING A FINGER GESTURE ON A TOUCH SCREEN DISPLAY

(75) Inventors: Kenneth Kocienda, Sunnyvale, CA (US); Scott Forstall, Mountain View, CA (US); Gregory Novick, Santa Clara, CA (US); Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1336 days.

(21) Appl. No.: 11/969,796

(22) Filed: Jan. 4, 2008

(65) Prior Publication Data
US 2008/0165160 A1 Jul. 10, 2008

Related U.S. Application Data

(60) Provisional application No. 60/937,993, filed on Jun. 29, 2007, provisional application No. 60/946,977, filed on Jun. 28, 2007, provisional application No. 60/879,469, filed on Jan. 8, 2007, provisional application No. 60/879,253, filed on Jan. 7, 2007.

(51) Int. Cl.
*G06F 3/041* (2006.01)

(52) U.S. Cl.
USPC .......................................... 345/173; 715/863

(58) Field of Classification Search
USPC ................... 345/173–179, 168; 715/863, 784
See application file for complete search history.

(56) References Cited

U.S. PATENT DOCUMENTS 5,627,567 A * 5/1997 Davidson ....................... 345/173
5,740,390 A 4/1998 Pickover et al. ............... 395/348
5,748,512 A 5/1998 Vargas ...................... 364/709.12

(Continued)

FOREIGN PATENT DOCUMENTS

EP 1 271 295 A2 1/2003
EP 1 569 079 A1 8/2005

(Continued)

OTHER PUBLICATIONS

Office Action dated Sep. 8, 2009 received in Australian Patent Application No. 2006291338, which corresponds to U.S. Appl. No. 11/228,737.

(Continued)

*Primary Examiner* — Adam R Giesy
(74) *Attorney, Agent, or Firm* — Morgan, Lewis & Bockius LLP

(57) ABSTRACT

A portable electronic device having a touch screen display detects a first finger-down event at a first position on the touch screen display. The first position is adjacent to first and second user interface objects. The portable device detects a second finger event at a second position on the touch screen display. The second finger event is either a finger-dragging event or a finger-up event. The portable device determines a type of the second finger event and a distance between the first position and the second position. The portable device performs a first action associated with the first user interface object if the distance is greater than a predefined threshold and performs a second action associated with the second user interface object if the distance is equal to or less than the predefined threshold and the second finger event is a finger-up event.

25 Claims, 16 Drawing Sheets

(56) References Cited

U.S. PATENT DOCUMENTS

| | | | |
|---|---|---|---|
| 5,757,358 A | 5/1998 | Osga | 345/146 |
| 5,805,165 A | 9/1998 | Thorne, III et al. | 345/348 |
| 5,825,352 A | 10/1998 | Bisset et al. | 345/173 |
| 5,877,751 A | 3/1999 | Kanemitsu et al. | 345/173 |
| 5,963,671 A | 10/1999 | Comerford et al. | 382/230 |
| 6,049,326 A | 4/2000 | Beyda et al. | 345/157 |
| 6,104,384 A | 8/2000 | Moon et al. | 345/168 |
| 6,259,436 B1* | 7/2001 | Moon et al. | 345/173 |
| 6,278,443 B1 | 8/2001 | Amro et al. | 345/173 |
| 6,295,052 B1 | 9/2001 | Kato et al. | |
| 6,411,283 B1 | 6/2002 | Murphy | 345/173 |
| 6,567,109 B1 | 5/2003 | Todd | 345/862 |
| 6,643,824 B1 | 11/2003 | Bates et al. | 715/501.1 |
| 6,938,220 B1* | 8/2005 | Shigematsu et al. | 715/863 |
| 7,046,230 B2 | 5/2006 | Zadesky et al. | |
| 7,277,088 B2 | 10/2007 | Robinson et al. | 345/173 |
| 7,352,365 B2 | 4/2008 | Trachte | 345/173 |
| 7,489,306 B2* | 2/2009 | Kolmykov-Zotov et al. | 345/173 |
| 7,495,659 B2 | 2/2009 | Marriott et al. | |
| 7,499,040 B2 | 3/2009 | Zadesky et al. | |
| 7,605,804 B2 | 10/2009 | Wilson | 345/173 |
| 7,656,393 B2 | 2/2010 | King et al. | |
| 7,663,607 B2 | 2/2010 | Hotelling et al. | |
| 7,800,592 B2 | 9/2010 | Kerr et al. | |
| 7,808,479 B1 | 10/2010 | Hotelling et al. | |
| 2002/0051018 A1* | 5/2002 | Yeh | 345/784 |
| 2003/0006967 A1* | 1/2003 | Pihlaja | 345/168 |
| 2003/0063073 A1* | 4/2003 | Geaghan et al. | 345/173 |
| 2004/0136564 A1 | 7/2004 | Roeber et al. | 381/100 |
| 2004/0155869 A1 | 8/2004 | Robinson et al. | 345/168 |
| 2004/0183833 A1 | 9/2004 | Chua | 345/773 |
| 2005/0116927 A1 | 6/2005 | Voelckers | 345/157 |
| 2005/0190970 A1* | 9/2005 | Griffin | 382/209 |
| 2006/0007174 A1* | 1/2006 | Shen | 345/173 |
| 2006/0026521 A1 | 2/2006 | Hotelling et al. | |
| 2006/0026535 A1 | 2/2006 | Hotelling et al. | |
| 2006/0085757 A1* | 4/2006 | Andre et al. | 715/771 |
| 2006/0161871 A1 | 7/2006 | Hotelling et al. | 715/863 |
| 2006/0181517 A1 | 8/2006 | Zadesky et al. | |
| 2006/0197753 A1 | 9/2006 | Hotelling | |
| 2006/0290679 A1* | 12/2006 | Lii | 345/173 |
| 2007/0247442 A1* | 10/2007 | Andre et al. | 345/173 |
| 2007/0247446 A1* | 10/2007 | Orsley et al. | 345/184 |
| 2007/0260987 A1 | 11/2007 | Mohoney et al. | 715/863 |
| 2007/0300182 A1* | 12/2007 | Bilow | 715/799 |
| 2008/0088602 A1 | 4/2008 | Hotelling | |
| 2008/0094356 A1* | 4/2008 | Ording et al. | 345/157 |
| 2008/0122796 A1 | 5/2008 | Jobs et al. | |
| 2009/0284471 A1 | 11/2009 | Longe et al. | 345/168 |
| 2009/0295753 A1 | 12/2009 | King et al. | |

FOREIGN PATENT DOCUMENTS

| | | |
|---|---|---|
| EP | 1 674 976 A2 | 6/2006 |
| GB | 2 351 639 A | 1/2001 |
| JP | 10 307673 | 11/1998 |
| JP | 2004 280590 | 10/2004 |
| JP | 2004 341813 | 12/2004 |
| WO | WO 00/38042 A1 | 6/2000 |

OTHER PUBLICATIONS

Office Action dated Oct. 19, 2009, received in U.S. Appl. No. 11/228,737.

Office Action dated Oct. 14, 2008, received in the European Patent Application which corresponds to U.S. Appl. No. 11/228,737.

Office Action dated Feb. 18, 2010, received in Australian Patent Application No. 2007292384, which corresponds to U.S. Appl. No. 11/850,015, 1 page.

Office Action dated Jun. 10, 2010, received in Chinese Application for Invention No. 200780040508.2, which corresponds to U.S. Appl. No. 11/850,015, 4 pages.

Office Action dated Jun. 7, 2010, received in German Patent Application No. 11 2007 002 088.1-53, which corresponds to U.S. Appl. No. 11/850,015, 8 pages.

Office Action dated Feb. 16, 2010, received in European Patent Application No. 07 814 691.7, which corresponds to U.S. Appl. No. 11/850;015, 7 pages.

Office Action dated Feb. 23, 2010, received in U.S. Appl. No. 11/228,737, 24 pages.

Final Office Action dated Jul. 6, 2010, received in U.S. Appl. No. 11/696,703, 11 pages.

Centroid, http://faculty,evansville.edu/ck6/tcenters/class/centroid.html, printed Apr. 28, 2006. 4 pages.

International Search Report and Written Opinion for International Application No. PCT/US2008/050426, mailed Jun. 13, 2008.

International Search Report and Written Opinion for International Application No. PCT/US2007/077645, mailed Jan. 10, 2008.

Office Action dated Mar. 19, 2009, for U.S. Appl. No. 11/228,737.

Office Action dated Jun. 7, 2010, received in U.S. Appl. No. 11/850,015.

Notice of Allowance dated Sep. 27, 2010, received in U.S. Appl. No. 11/850,015.

Notice of Allowance dated Sep. 7, 2010, received in U.S. Appl. No. 11/228,737.

Office Action dated Oct. 5, 2010, received in Australian Patent Application No. 2006291338, which corresponds to U.S. Appl. No. 11/228,737.

European Search Report dated May 16, 2011, received in European Patent Application No. 11154035.7, which corresponds to U.S. Appl. No. 11/850,015.

Office Action dated Apr. 1, 2010, received in Australian Patent Application No. 2008204988, which corresponds to U.S. Appl. No. 11/969,796.

Notice of Acceptance dated Apr. 7, 2011, received in Australian Patent Application No. 2008204988, which corresponds to U.S. Appl. No. 11/969,796.

Office Action dated Nov. 1, 2010, received in Chinese Patent Application No. 200880007119.4, which corresponds to U.S. Appl. No. 11/969,796.

Office Action dated Jun. 8, 2011, received in Chinese Patent Application No. 200880007119.4, which corresponds to U.S. Appl. No. 11/969,796.

Office Action dated Jan. 24, 2011, received in Korean Patent Application No. 10-2009-7016497, which corresponds to U.S. Appl. No. 11/969,796.

Office Action dated Mar. 10, 2011, received in Chinese Patent Application No. 200780040508.2, which corresponds to U.S. Appl. No. 11/850,015.

Intention to grant a European Patent dated Nov. 8, 2010, received in European Patent Application No. 07 814 691.7, which corresponds to U.S. Appl. No. 11/850,015.

Decision to Grant European Patent dated Mar. 24, 2011, received in European Patent Application No. 07814691.7, which corresponds to U.S. Appl. No. 11/850,015.

Office Action dated Jan. 17, 2011, received in Korean Patent Application No. 10-2009-7007039, which corresponds to U.S. Appl. No. 11/850,015.

Notice of Acceptance dated Jan. 4, 2011, received in Australian Patent Application No. 2006291338, which corresponds to U.S. Appl. No. 11/228,737.

Office Action dated Oct. 23, 2009, received in Chinese Patent Application No. 200680033988.5, which corresponds to U.S. Appl. No. 11/228,737.

Office Action dated Nov. 24, 2010, received in Chinese Patent Application No. 200680033988.5, which corresponds to U.S. Appl. No. 11/228,737.

Office Action dated Mar. 22, 2011, received in Japanese Patent Application No. 2008531104, which corresponds to U.S. Appl. No. 11/228,737.

Office Action dated Nov. 26, 2009, received in Korean Application No. 10 2008 7006392, which corresponds to U.S. Appl. No. 11/228,737.

Notice of Allowance dated Oct. 20, 2010, received in U.S. Appl. No. 11/696,703.

Final Office Action dated Feb. 10, 2011, received in U.S. Appl. No. 12/957,185.

Notice of Allowance dated Jun. 17, 2011, received in U.S. Appl. No. 12/957,185.

Tidwell J., "Designing Interfaces," Nov. 2006, O'Reilly Media, Inc., 348 pages.

Westerman, W., "Hand Tracking Finger Identification and Chordic Manipulation on a Multi-touch Surface," Doctoral Dissertation, submitted Spring 1999, 363 pages.

Office Action dated Noventber 2, 2011, received in Chinese Patent Application No. 200880007119.4, which corresponds to U.S. Appl. 11/969,796 (Kocienda).

Office Action dated Jun. 28, 2011, received in European Application No. 08 727 399.1 which corresponds to U.S. Appl. No. 11/969,796 (Kocienda).

Office Aciton dated Dec. 19. 2011, received Japanese Patent Application No. 2009-545010, which corresponds to U.S. Appl. No. 11/969,796 (Kocienda).

Notice of Allowance dated Sep. 29, 2011, received in Korean Patent Application No. 10-2009-7016497, which corresponds to U.S. Appl. No. 11/969,796 (Kocienda).

Notice of Acceptance dated Nov. 17, 2011, received in Australian Patent Application No. 2007292384, which corresponds to U.S. Appl. No. 11/850,015 (Ording).

Office Action dated Aug. 15, 2011, received in Japanese Patent Application No. 2009-527542, which corresponds to U.S. Appl. No. 11/850,015 (Ording).

Office Action dated Dec. 7, 2011, received in Chinese Patent Application No. 200680033988.5, which corresponds to U.S. Appl. No. 11/228,737 (Andre).

Office Action dated Nov. 23, 2011, received in European Patent Application No. 06 789 731.4, which corresponds to U.S. Appl. No. 11/228,737 (Andre).

Office Action dated Dec. 7, 2009, received in European Patent Application No. 08 727 399.1, which corresponds to U.S. Appl. No. 11/969,796.

Office Action dated Dec. 11, 2009, received in U.S. Appl. No. 11/696,703.

* cited by examiner

PORTABLE MULTIFUNCTION DEVICE, METHOD, AND GRAPHICAL USER INTERFACE FOR INTERPRETING A FINGER GESTURE ON A TOUCH SCREEN DISPLAY

RELATED APPLICATIONS

This application claims priority to U.S. Provisional Patent Application Nos. 60/937,993, "Portable Multifunction Device," filed Jun. 29, 2007; 60/946,977, "Portable Multifunction Device, Method, and Graphical User Interface for Interpreting a Finger Gesture on a Touch Screen Display," filed Jun. 28, 2007; 60/879,469, "Portable Multifunction Device," filed Jan. 8, 2007; and 60/879,253, "Portable Multifunction Device," filed Jan. 7, 2007. All of these applications are incorporated by reference herein in their entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; and (11) U.S. Provisional Patent Application No. 60/824,769, "Portable Multifunction Device," filed Sep. 6, 2006. All of these applications are incorporated by reference herein in their entirety.

TECHNICAL FIELD

The disclosed embodiments relate generally to portable electronic devices, and more particularly, to portable devices that can uniquely determine operations associated with a finger gesture when the finger gesture occurs near multiple icons on a touch screen display.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Although a portable device with a touch screen including virtual icons such as keys and buttons may be configuration-flexible and user-friendly, it is often unable to correctly identify a virtual icon associated with a finger gesture and act accordingly if the finger gesture occurs in the vicinity of multiple virtual icons in a small area on the touch screen display. This is especially true if two or more of the virtual icons have overlapping hit regions (which may extend outward from, or surround, the displayed icons) and the finger gesture at least partially falls into the overlapping region.

Accordingly, there is a need for portable multifunction devices for uniquely determining an icon associated with a finger gesture if the finger gesture falls into an overlapping hit region shared by two or more virtual icons on a touch screen display.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

One aspect of the invention involves a computer-implemented method performed by a portable multifunction device with a touch screen display. After detecting a finger-down event at a first position on the touch screen display and a finger-up event at a second position on the touch screen display, the device determines a distance between the first position and the second position. If the distance is equal to or less than a first predefined threshold, the device performs a first action with respect to a first user interface object displayed on the touch screen display. If the distance is greater than a second predefined threshold, the device then performs a second action with respect to a second user interface object displayed on the touch screen display, which is different from the first user interface object.

Another aspect of the invention involves a computer-implemented method performed by a portable multifunction device with a touch screen display. After detecting a finger-down event at a first position on the touch screen display and a finger-up event at a second position on the touch screen display, the device determines a distance between the first position and the second position and identifies a button control user interface object and a slide control user interface object, both displayed on the touch screen display and both user interface objects being associated with the first position. For example, the first position may be within an overlapping "hidden hit region" shared by the hit regions of the two objects. The slide control user interface object includes a slide bar and a slide object. If the distance is equal to or less than a first predefined threshold, the device activates the button control user interface object. If the distance is greater than a second predefined threshold, the device then moves the slide object along the slide bar in accordance with the distance between the first position and the second position.

Another aspect of the invention involves a graphical user interface on a portable electronic device with a touch screen display. The graphical user interface includes a first user interface object and a second user interface object displayed on the touch screen display. After detecting a finger-down event at a first position and a finger-up event at a second position on the touch screen display, the device determines a distance between the first position and the second position. If the distance is equal to or less than a first predefined threshold, the device performs a first action with respect to a first user interface object. If the distance is greater than a second predefined threshold, the device then performs a second action with respect to a second user interface object, which is different from the first user interface object. In some embodiments, the two user interface objects have hit regions, including "hidden hit regions" that surround the user interface objects. The hidden hit regions may overlap, sharing an overlapping hidden hit region. When the aforementioned first position falls within the overlapping hit region on the touch screen display, the action performed by the device in response depends on the distance between the first and second positions.

Another aspect of the invention involves a portable electronic device with a touch screen display with a plurality of user interface objects. The device includes one or more processors, memory, and one or more programs stored in the memory and configured to be executed by the one or more processors. The one or more programs include: instructions for detecting a finger-down event at a first position on the touch screen display; instructions for detecting a finger-up event at a second position on the touch screen display; instructions for determining a distance between the first position and the second position; instructions for performing a first action with respect to a first user interface object displayed on the touch screen display if the distance is equal to or less than a first predefined threshold; and instructions for performing a second action with respect to a second user interface object displayed on the touch screen display if the distance is greater than a second predefined threshold, wherein the second user interface object is distinct from the first user interface object.

Another aspect of the invention involves a computer readable storage medium having stored therein instructions, which when executed by a portable electronic device with a touch screen display with a plurality of user interface objects, cause the device to: detect a finger-down event at a first position on the touch screen display; detect a finger-up event at a second position on the touch screen display; determine a distance between the first position and the second position; perform a first action with respect to a first user interface object displayed on the touch screen display if the distance is equal to or less than a first predefined threshold; and perform a second action with respect to a second user interface object displayed on the touch screen display if the distance is greater than a second predefined threshold, wherein the second user interface object is distinct from the first user interface object.

Another aspect of the invention involves a portable electronic device with a touch screen display with a plurality of user interface objects. The device includes: means for detecting a finger-down event at a first position on the touch screen display; means for detecting a finger-up event at a second position on the touch screen display; means for determining a distance between the first position and the second position; means for performing a first action with respect to a first user interface object displayed on the touch screen display if the distance is equal to or less than a first predefined threshold; and means for performing a second action with respect to a second user interface object displayed on the touch screen display if the distance is greater than a second predefined threshold, wherein the second user interface object is distinct from the first user interface object.

Another aspect of the invention involves a computer-implemented method performed by a portable electronic device that has a touch screen display with a plurality of user interface objects. The portable device detects a first finger-down event at a first position on the touch screen display. The first position is adjacent to a first user interface object and a second user interface object. The first user interface object is different from the second user interface object. The portable device detects a second finger event at a second position on the touch screen display. The second finger event is one selected from the group consisting of a finger-dragging event and a finger-up event. The portable device determines a type of the second finger event and a distance between the first position and the second position. The portable device performs a first action associated with the first user interface object if the distance is greater than a predefined threshold. The portable device performs a second action associated with the second user interface object if the distance is equal to or less than the predefined threshold and the second finger event is a finger-up event.

Another aspect of the invention involves a graphical user interface on a portable electronic device with a touch screen display. The graphical user interface comprises a plurality of user interface objects, including a first user interface object and a second user interface object displayed on the touch screen display. The first user interface object is different from the second user interface object. In response to detecting: a first finger-down event at a first position on the touch screen display, wherein the first position is adjacent to the first user interface object and the second user interface object, and a second finger event at a second position on the touch screen display, wherein the second finger event is one selected from the group consisting of a finger-dragging event and a finger-up event, a type of the second finger event and a distance between the first position and the second position are determined. A first action associated with the first user interface object is performed if the distance is greater than a predefined threshold. A second action associated with the second user interface object is performed if the distance is equal to or less than the predefined threshold and the second finger event is a finger-up event.

Another aspect of the invention involves a portable electronic device with a touch screen display with a plurality of user interface objects. The device includes one or more processors, memory, and one or more programs stored in the memory and configured to be executed by the one or more processors. The one or more programs include instructions for detecting a first finger-down event at a first position on the touch screen display. The first position is adjacent to a first user interface object and a second user interface object. The first user interface object is different from the second user interface object. The one or more programs also include instructions for detecting a second finger event at a second position on the touch screen display. The second finger event is one selected from the group consisting of a finger-dragging event and a finger-up event. The one or more programs also include: instructions for determining a type of the second finger event and a distance between the first position and the second position; instructions for performing a first action associated with the first user interface object if the distance is greater than a predefined threshold; and instructions for performing a second action associated with the second user interface object if the distance is equal to or less than the predefined threshold and the second finger event is a finger-up event.

Another aspect of the invention involves a computer readable storage medium having stored therein instructions, which when executed by a portable electronic device with a touch screen display with a plurality of user interface objects, cause the device to detect a first finger-down event at a first position on the touch screen display. The first position is adjacent to a first user interface object and a second user interface object. The first user interface object is different from the second user interface object. The instructions also cause the device to detect a second finger event at a second position on the touch screen display. The second finger event is one selected from the group consisting of a finger-dragging event and a finger-up event. The instructions also cause the device to: determine a type of the second finger event and a distance between the first position and the second position; perform a first action associated with the first user interface object if the distance is greater than a predefined threshold; and perform a second action associated with the second user interface object if the distance is equal to or less than the predefined threshold and the second finger event is a finger-up event.

Another aspect of the invention involves a portable electronic device with a touch screen display with a plurality of user interface objects. The device includes: means for detecting a first finger-down event at a first position on the touch screen display. The first position is adjacent to a first user interface object and a second user interface object. The first user interface object is different from the second user interface object. The device also includes means for detecting a second finger event at a second position on the touch screen display. The second finger event is one selected from the group consisting of a finger-dragging event and a finger-up event. The device also includes: means for determining a type of the second finger event and a distance between the first position and the second position; means for performing a first action associated with the first user interface object if the distance is greater than a predefined threshold; and means for performing a second action associated with the second user interface object if the distance is equal to or less than the predefined threshold and the second finger event is a finger-up event.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
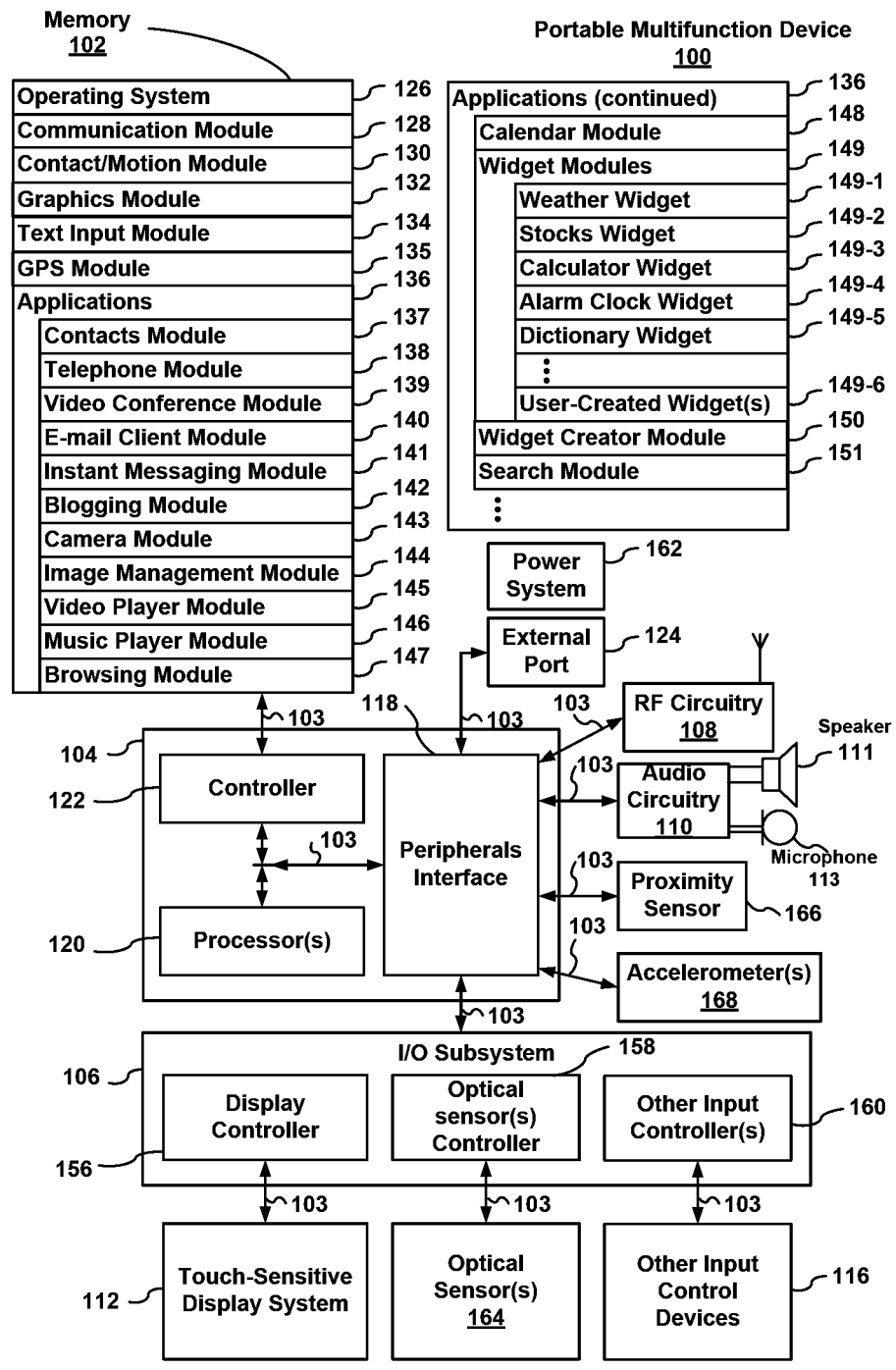
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference herein in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
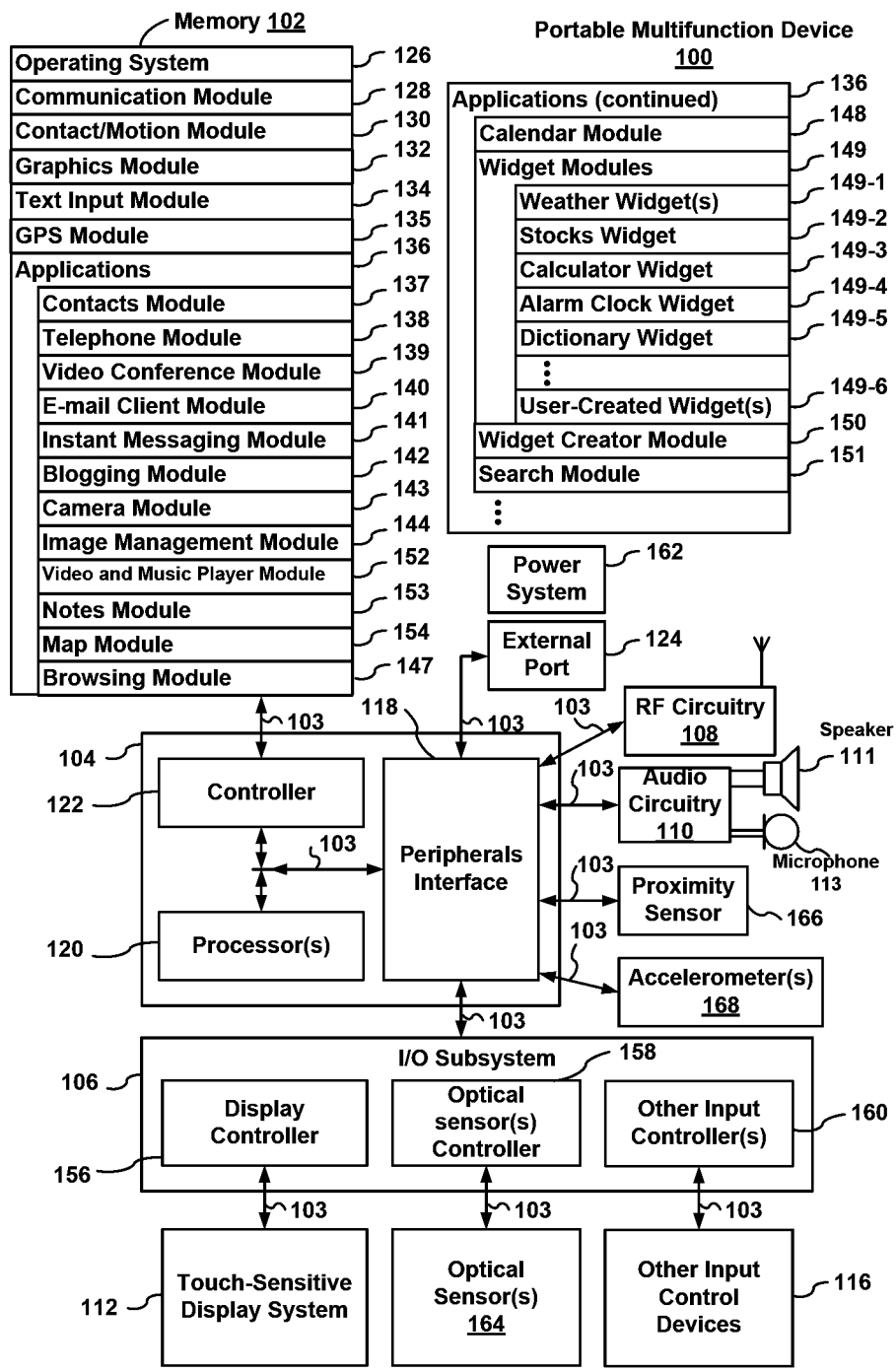

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HS- DPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference herein in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 1 12. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference herein in their entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing one or more actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 1 16. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. 11/620,702, filed Jan. 7, 2007, "Using Ambient Light Sensor To Augment Proximity Sensor Output,"; Ser. No. 11/586,862, filed Oct. 24, 2006, "Automated Response To And Sensing Of User Activity In Portable Devices,"; and Ser. No. 11/638,251, filed Dec. 12, 2006, "Methods And Systems For Automatic Configuration Of Peripherals," which are hereby incorporated by reference herein in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153; and/or
- map module 154.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
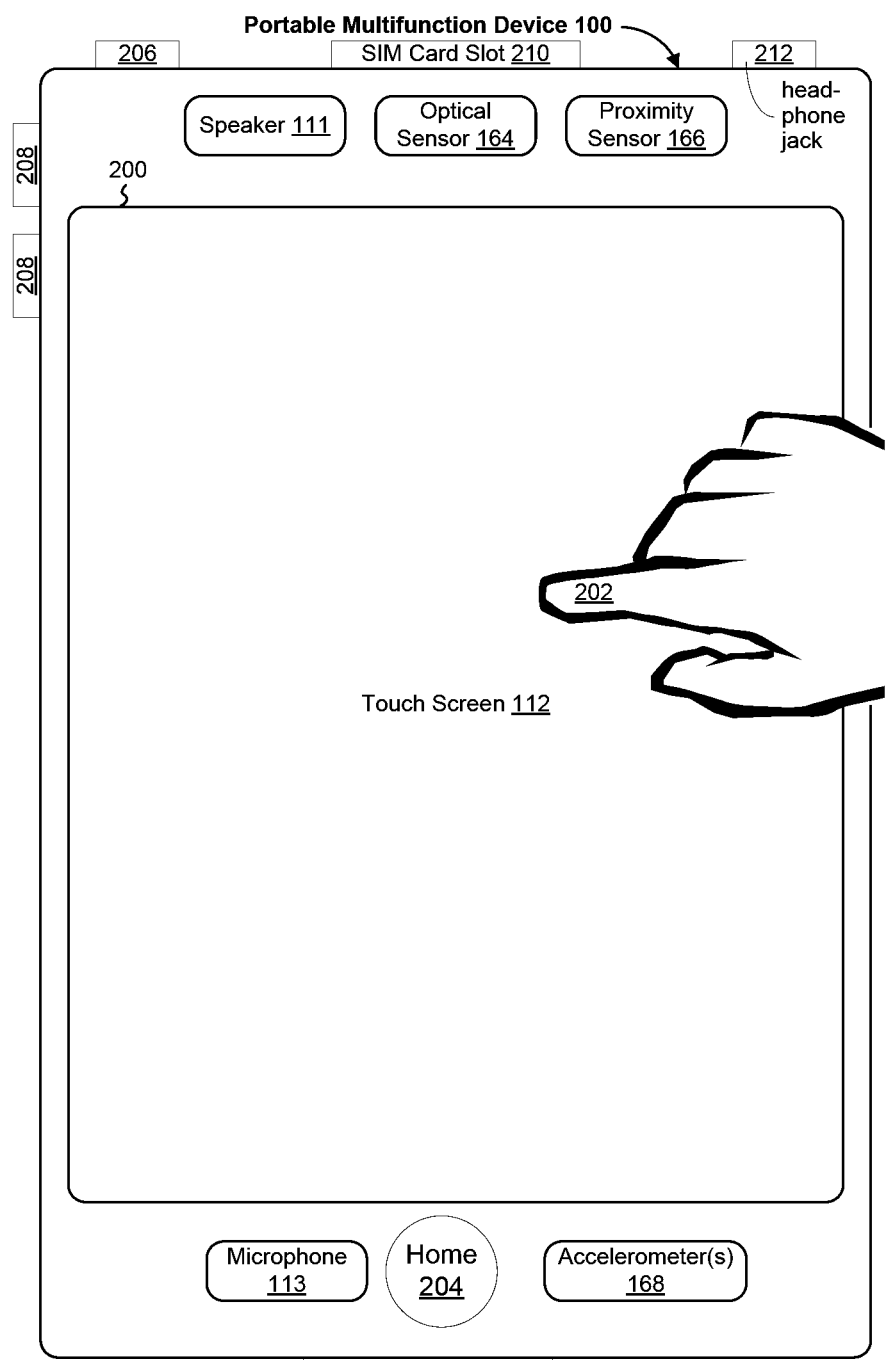
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
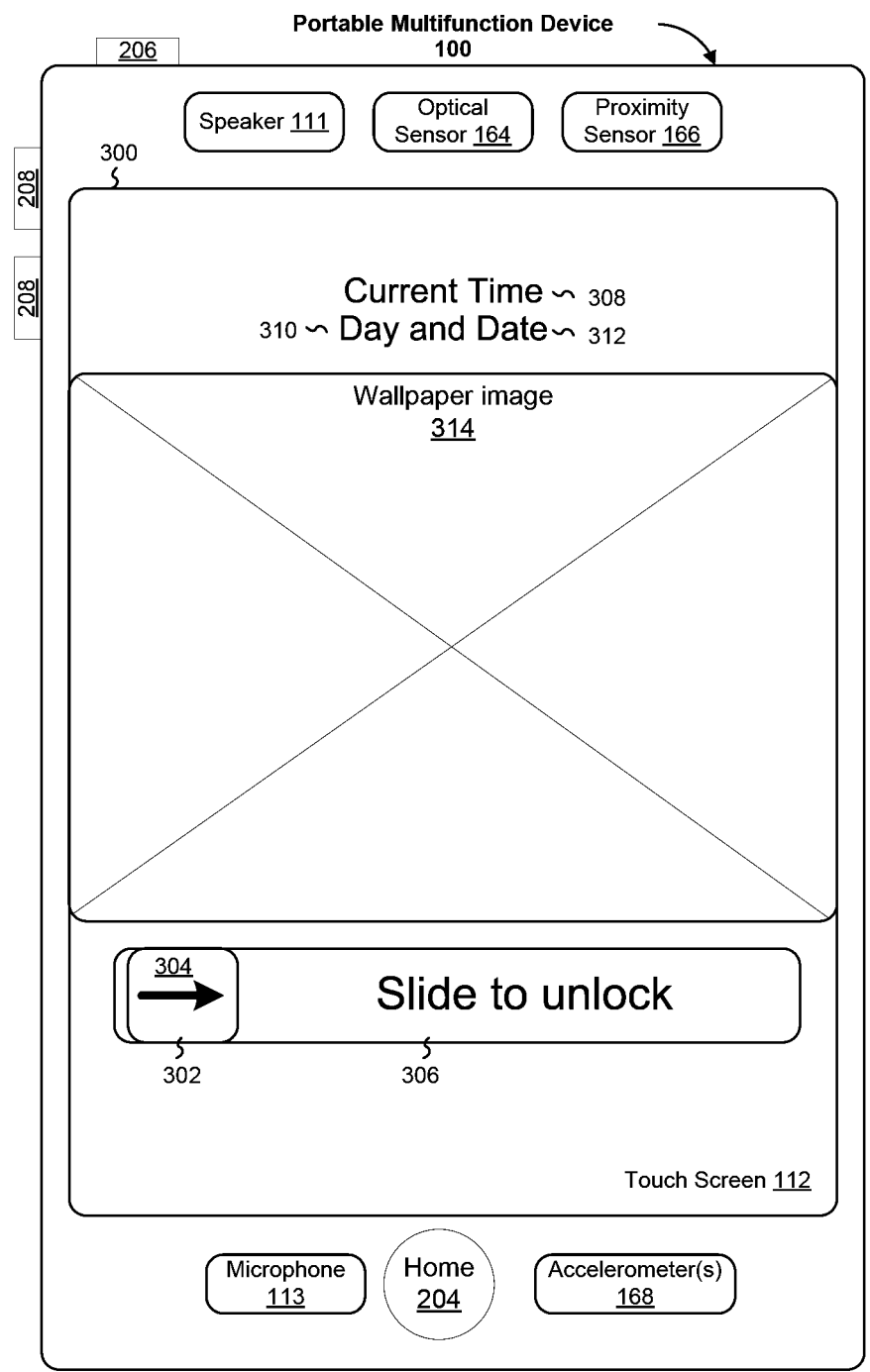
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:
- Unlock image 302 that is moved with a finger gesture to unlock the device;
- Arrow 304 that provides a visual cue to the unlock gesture;
- Channel 306 that provides additional cues to the unlock gesture;
- Time 308;
- Day 310;
- Date 312; and
- Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent applications Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference herein in their entirety.

Figure 4A:
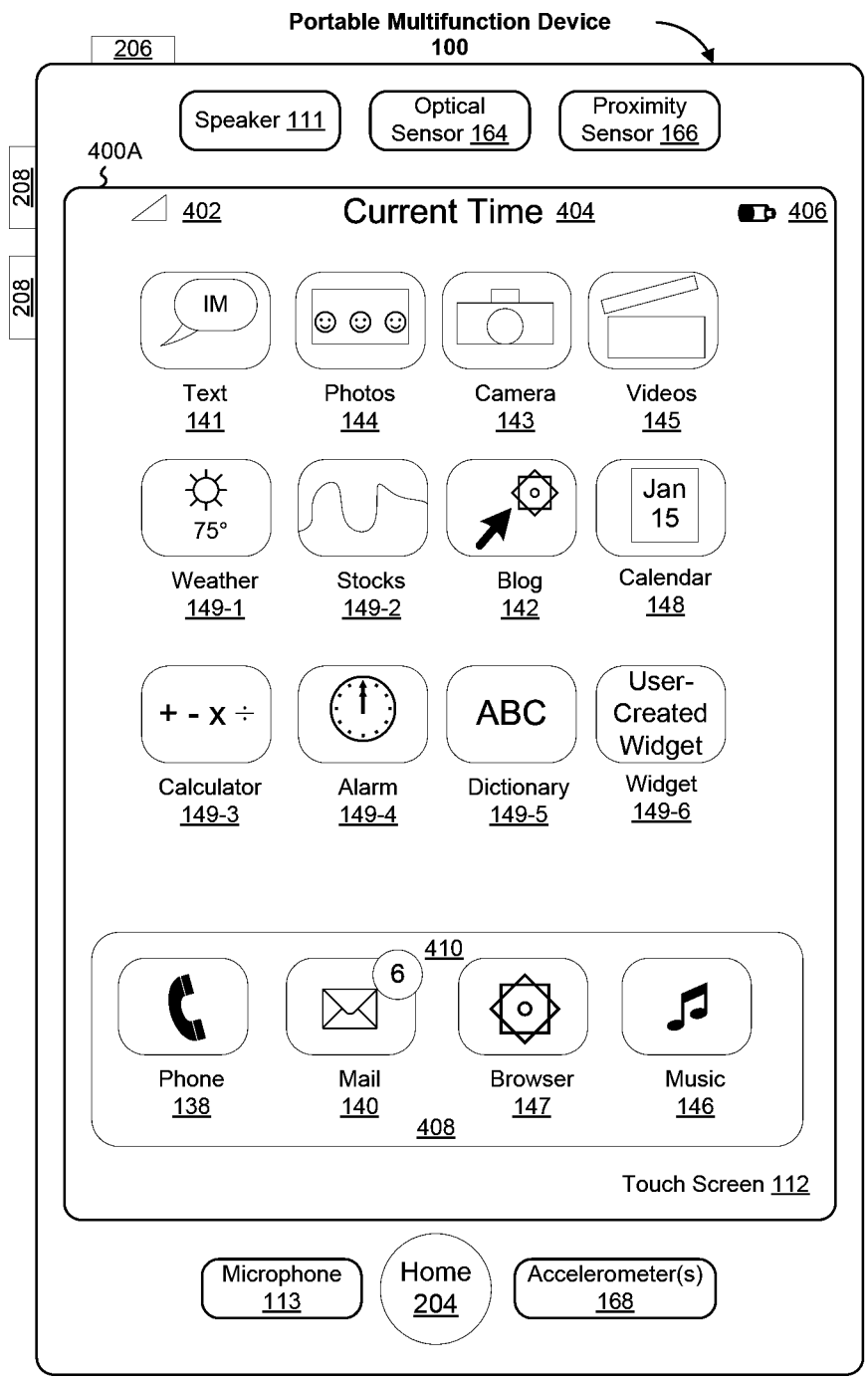
FIGS. 4A and 4B illustrate exemplary user interfaces for a menu of applications on a portable multifunction device in accordance with some embodiments.
Figure 4B:
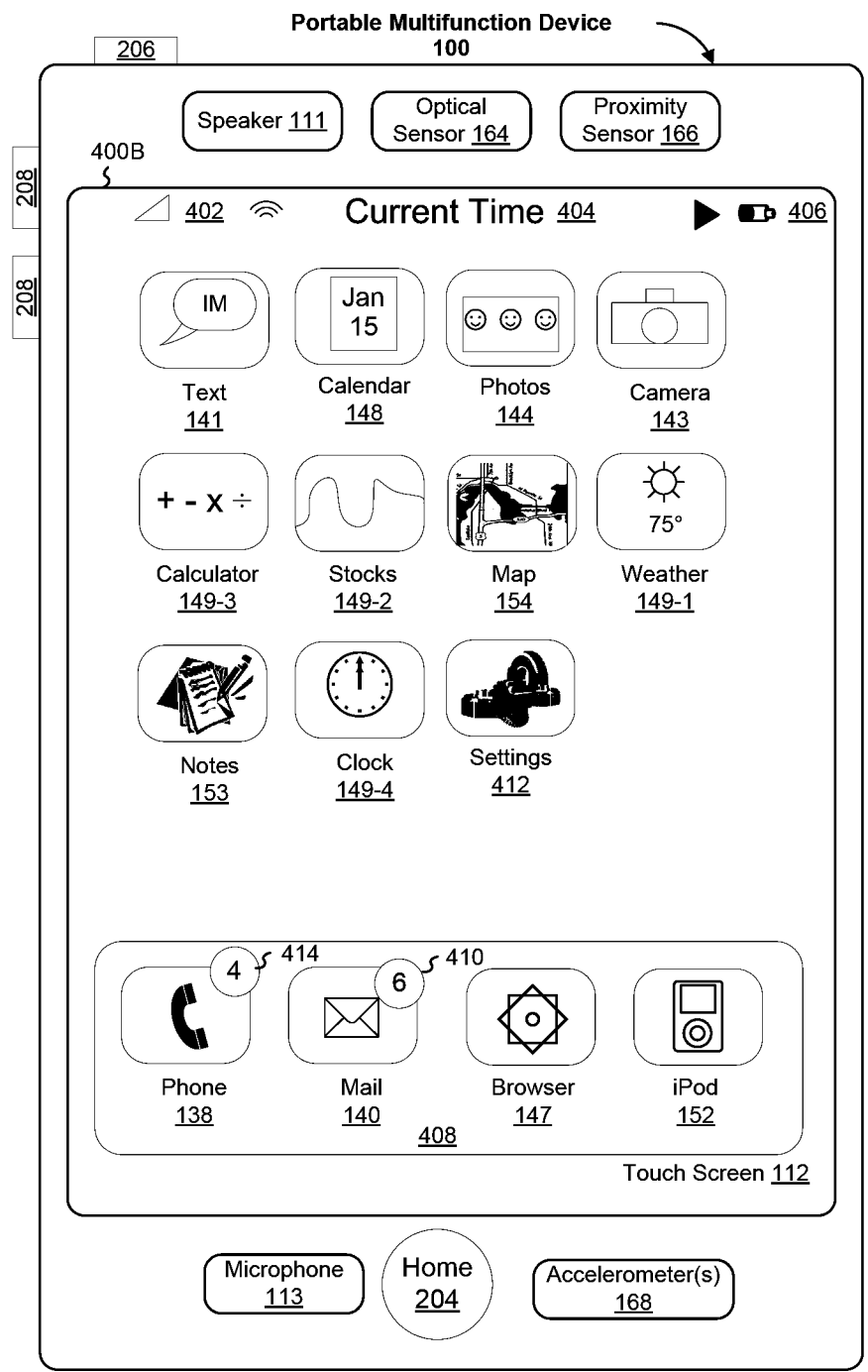

FIGS. 4A and 4B illustrate exemplary user interfaces for a menu of applications on a portable multifunction device in accordance with some embodiments. In some embodiments, user interface 400A includes the following elements, or a subset or superset thereof:
- Signal strength indicator(s) 402 for wireless communication(s), such as cellular and Wi-Fi signals;
- Time 404;
- Battery status indicator 406;
- Tray 408 with icons for frequently used applications, such as one or more of the following:
  - Phone 138, which may include an indicator 414 of the number of missed calls or voicemail messages;
  - E-mail client 140, which may include an indicator 410 of the number of unread e-mails;
  - Browser 147; and
  - Music player 146; and
- Icons for other applications, such as one or more of the following:
  - IM 141;
  - Image management 144;
  - Camera 143;
  - Video player 145;
  - Weather 149-1;
  - Stocks 149-2;
  - Blog 142;
  - Calendar 148;
  - Calculator 149-3;
  - Alarm clock 149-4;
  - Dictionary 149-5; and
  - User-created widget 149-6.

In some embodiments, user interface 400B includes the following elements, or a subset or superset thereof:
- 402, 404, 406, 141, 148, 144, 143, 149-3, 149-2, 149-1, 149-4, 410, 414, 138, 140, and 147, as described above;
- Map 154;
- Notes 153;
- Settings 412, which provides access to settings for the device 100 and its various applications 136; and
- Video and music player module 152, also referred to as iPod (trademark of Apple Computer, Inc.) module 152.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference herein in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference herein in its entirety.

In some embodiments, an application module may have multiple closely-placed virtual icons on the touch screen, each virtual icon having an associated set of predefined operations. At least some of the virtual icons have hidden hit regions surrounding the virtual icons such that a user contact with a hidden hit region of a virtual icon (although not exactly on the virtual icon itself) can trigger the device to perform the same set of operations associated with the virtual icon. Because the touch screen is relatively small, the hit regions of two adjacent virtual icons may partially overlap each other.

This situation becomes a challenge for the portable device if a user contact with one of the two virtual icons occurs within the overlapping hit region.

Figure 5:
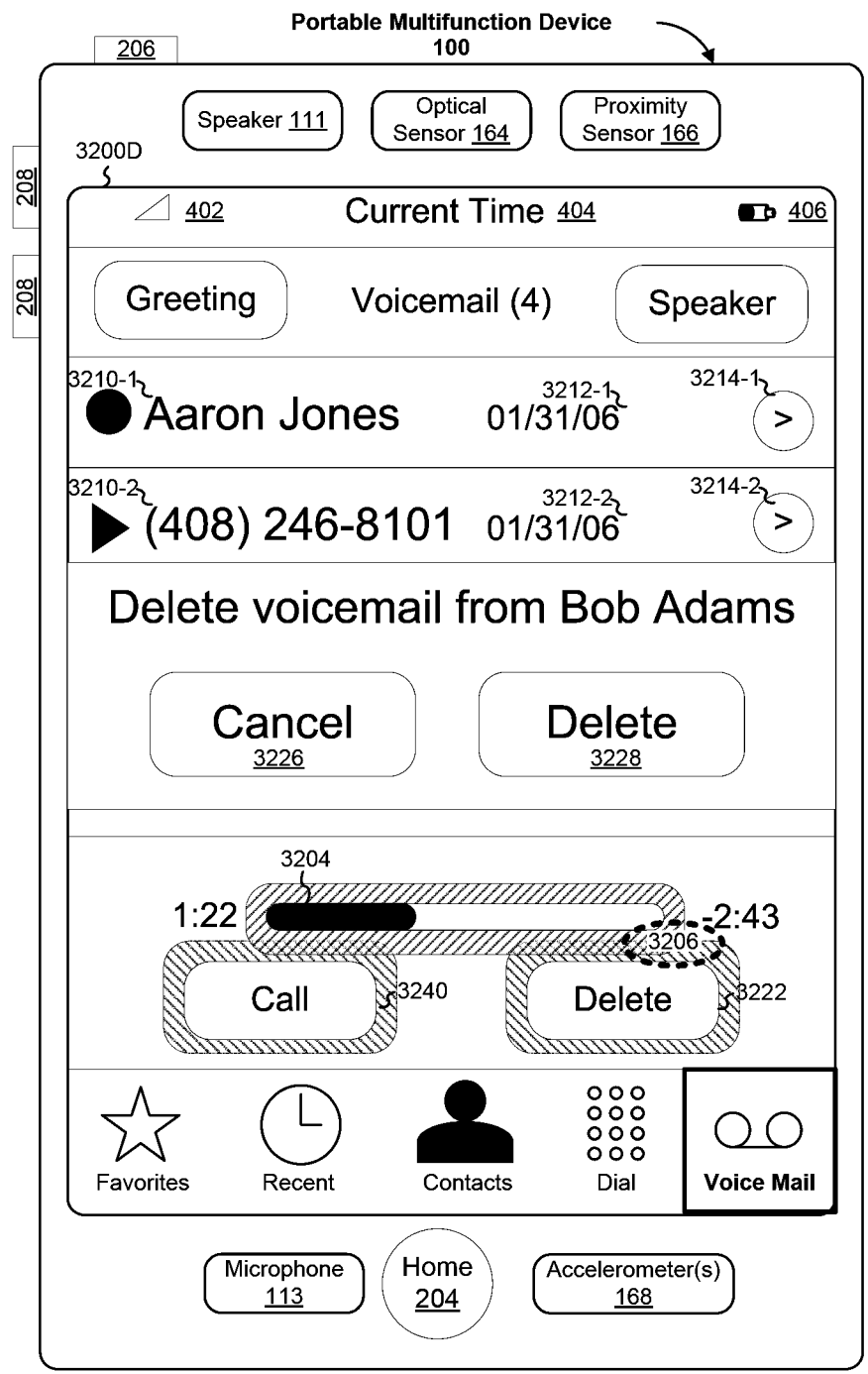
FIG. 5 illustrates an exemplary user interface for voicemail in accordance with some embodiments.

FIG. 5 illustrates an exemplary user interface for voicemail in accordance with some embodiments. Among other objects, the user interface 3200D includes the following icons:

Progress bar 3204 that indicates what fraction of a voicemail message has been played and that may be used to scroll through the message in response to a finger swipe gesture;

Delete icon 3222 that when activated (e.g., by a finger tap on the icon) initiates display of a UI to confirm that the user wants to delete the corresponding voicemail; and Call icon 3240 that when activated (e.g., by a finger tap on the icon) initiates a call to the phone number associated with the selected voicemail.

Each of the three icons 3204, 3240, 3222 has a respective hidden hit region (as represented by the corresponding meshed region surrounding each of the icons). But because the Progress bar 3204 is so close to the Call icon 3240 and the Delete icon 3222, its hidden hit region overlaps with the two icons' hidden hit regions, respectively. These overlapping hit regions cause a problem when an initial user contact with the touch screen occurs within one of the overlapping regions. For example, the initial finger contact 3206 that falls into the overlapping hit region between the Progress bar 3204 and the Delete icon 3222 may have two possible interpretations: (i) the user wants to fast-forward the message to the point corresponding to the horizontal location of the finger contact 3206 or (ii) the user wants to delete the voicemail currently being played by the portable device. A misinterpretation of the initial finger contact 3206 (i.e., if the interpretation chosen by the portable device is different from the user's actual intention) would result in unsatisfactory user experience with the portable device.

In some embodiments, a method of avoiding such misinterpretation of an initial user contact that falls within an overlapping hit region is to defer interpreting the initial user contact until a unique interpretation can be reached based in part on a subsequent finger interaction with the touch screen.

Figure 6:
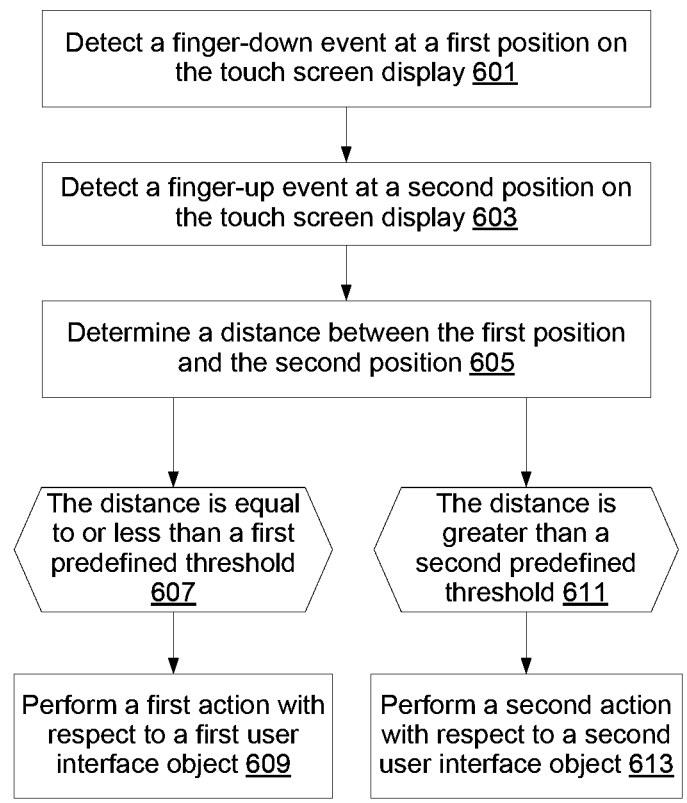
FIG. 6 is a flow diagram illustrating a process for performing a predefined action in response to a finger gesture near two adjacent user interface objects in accordance with some embodiments.

Below are descriptions of several embodiments of methods of disambiguating the user's actual intention if the initial user contact with the touch screen falls into an overlapping hidden hit region. FIG. 6 is a flow diagram illustrating a process for performing a predefined action in response to a finger gesture near two adjacent user interface objects in accordance with some embodiments. FIGS. 7A-7D are exemplary embodiments illustrating how a portable device identifies one of two adjacent user interface objects that have an overlapping hit region in response to a finger gesture that falls in the overlapping hit region and then performs a user-desired action.

The term "user interface object" (which is interchangeable with "graphical object" in this application) generally refers to a graphical icon displayed on the touch screen display, which may be associated with an information item or a set of application operations depending on the specific application module that employs the schemes described herein.

Figure 7A:
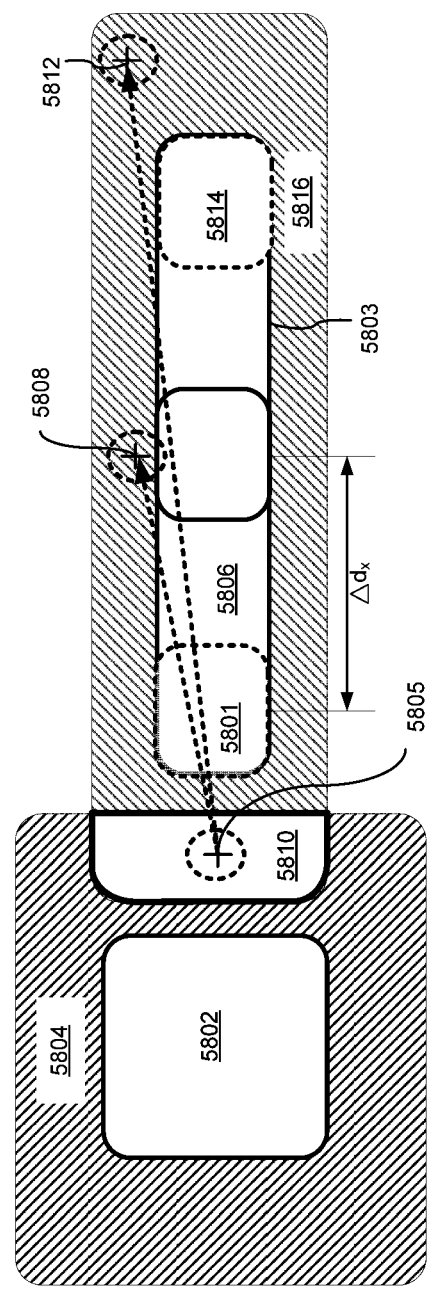
FIGS. 7A-7D are exemplary embodiments illustrating how a portable device identifies one of two adjacent user interface objects that have an overlapping hit region in response to a finger gesture that falls in the overlapping hit region and then performs a user-desired action.

FIG. 7A depicts two user interface objects, e.g., a button control user interface object 5802 and a slide control user interface object 5806, next to each other on the touch screen display. For example, the button control object 5802 may be the backup control icon, the play icon, or the forward icon, and the slide control user interface object 5806 may be the volume control icon of the music and video player module 152.

In some embodiments, the button control user interface object 5802 has a hidden hit region 5804 and the slide control user interface object 5806 has a hidden hit region 5816. The two hidden hit regions overlap at region 5810.

The portable device detects a finger-down event at a first position on the touch screen display (601). As shown in FIG. 7A, the finger-down event occurs at a position 5805 within the overlapping hit region 5810. From this single finger-down event, it cannot be determined whether the user intends to activate the button control user interface object 5802 or the slide control user interface object 5806.

In some embodiments, using the finger-down event position 5805, which is also the current cursor position, the portable device identifies all the user interface objects that are associated with the position. A user interface object is associated with a cursor position if the position is within the user interface object or its hidden hit region. Therefore, both the button control user interface object 5802 and the slide control user interface object 5806 are identified as being associated with the first position 5805. Note that the slide control user interface object 5806 includes a slide bar 5803 and a slide object 5801.

Finger contacts with the touch screen typically have different patterns. For example, a finger tap gesture on the touch screen often occurs at a button-style user interface object (e.g., a key icon of the soft keyboard), which comprises a finger-down event followed by a finger-up event at the same position, or substantially the same position as the finger-down event. A finger swipe gesture on the touch screen is often (but not always) associated with a slide control user interface object (e.g., the volume control icon of the music and video player), which comprises a finger-down event followed by one or more finger-dragging events, and subsequently followed by a finger-up event.

In some embodiments, a parameter is used to describe the process of a finger approaching a touch screen display, contacting the touch screen display, and leaving the touch screen display. The parameter can be a distance between the finger and the touch screen display, a pressure the finger has on the touch screen display, a contact area between the finger and the touch screen, a voltage between the finger and the touch screen, a capacitance between the finger and the touch screen display or a function of one or more of the physical parameters.

In some embodiments, depending on the magnitude of the parameter (e.g., capacitance) between the finger and the touch screen display, a finger-down event occurs when the parameter rises above a predefined threshold, a finger-dragging event occurs when the finger's corresponding cursor position moves from location A to location B while the parameter remains above the predefined threshold, and a finger-up event occurs when the parameter drops below the threshold level.

Following the finger-down event, the portable device detects a finger-up event at a second position on the touch screen display (603). Given the first and second positions corresponding to the finger-down and finger-up events, the portable device determines a distance between the two positions (605). In some embodiments, the amount of the distance implies the user's actual intention as to which user interface object should be activated and what action(s) the portable device should take.

If the distance is equal to or less than a first predefined threshold (607), the user contact is interpreted as activating a first user interface object (e.g., the button control 5802, FIGS. 7C and 7D) and the device then performs a first action corresponding to the first user interface object (609).

In some contexts in which the user gesture activates the button control user interface object 5802, the second position (e.g., 5817 in FIG. 7C) is also within the overlapping hit region. In some other contexts in which the user gesture activates the button control user interface object 5802, the second position (e.g., 5807 in FIG. 7D) is within the hit region 5804 of the object 5802, but not within the slide control user interface object 5806's hit region. In either case, the device activates the button control user interface object 5802 to perform a predefined operation (e.g., displaying a GUI allowing the user to delete a voicemail message).

If the distance is greater than a second predefined threshold (611), the user contact is then interpreted as activating a second user interface object (e.g., the slide control 5806, FIGS. 7A and 7B) and the device performs a second action associated with the second user interface object (613).

Figure 7B:
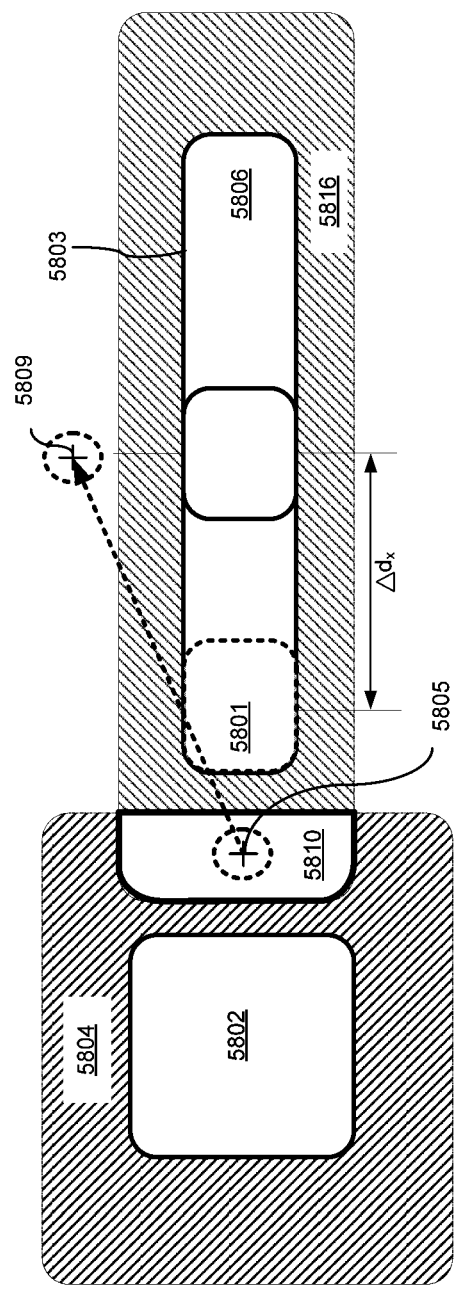
Figure 7C:
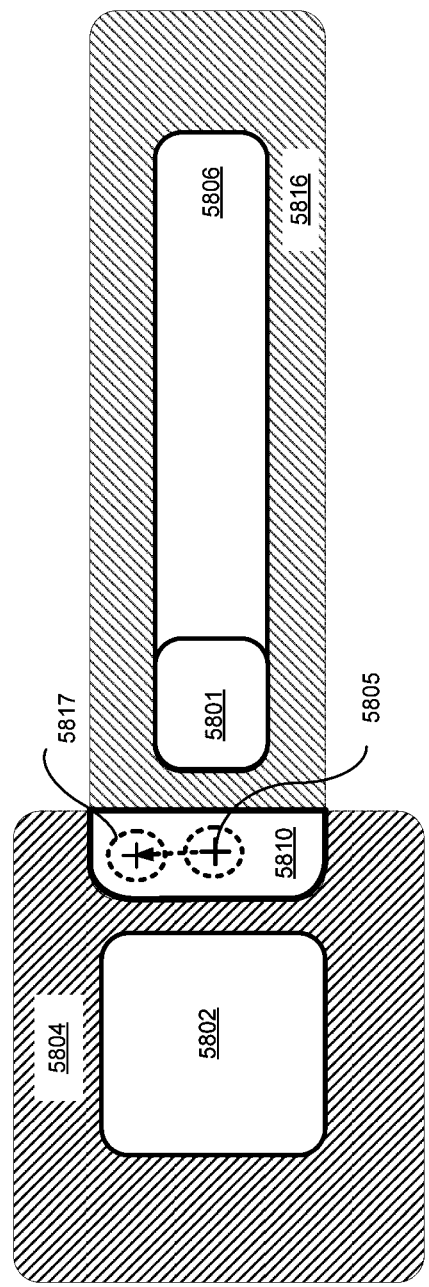
Figure 7D:
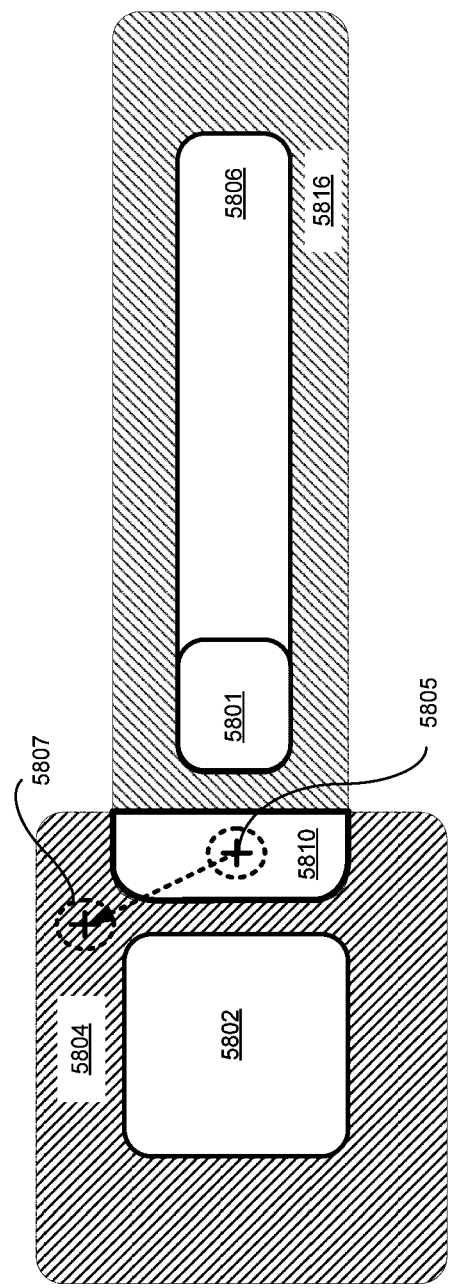

In some contexts in which the user gesture activates the slide control user interface object 5806, the second position (e.g., 5808 in FIG. 7A) is within the hit region 5816 of the slide control user interface object 5806 and not within the hit region 5804 of the button control user interface object 5802. In some other contexts in which the user gesture activates the slide control user interface object 5806, the second position (e.g., 5809 in FIG. 7B) is outside hit region 5816, but has a projection onto the slide bar. In either case, the device moves the slide object 5801 along the slide bar 5803 to a position in accordance with the projection of the second position onto the slide bar. In some embodiments, the slide object 5801 does not move beyond the two opposite ends of the slide bar irrespective of the distance between the two positions as projected onto the slide bar. As shown in FIGS. 7A-7B, the distance $\Delta d_x$ by which the slide object 5801 is moved along the slide bar corresponds to the projection of the second position onto the slide bar 5803. If the finger keeps moving to the right as shown in FIG. 7A such that the second position 5812 is projected outside the slide bar (i.e., beyond the right end of the slide bar), the slide object 5801 will stop at its rightmost position 5814.

In some embodiments, the first user interface object is a different type of user interface object than the second user interface object (e.g., a button object versus a slide control object). The first and second predefined thresholds may have the same value, while in other embodiments they have distinct values. In some other embodiments, the second predefined threshold is higher than the first predefined threshold. In the latter embodiments, if the distance is between the two positions is between the first and second thresholds, neither the first nor the second user interface object is activated (or more generally, no action is performed with respect to either object. As a result, the user will need to more clearly indicate his or her intent by performing another finger gesture.

In addition, in some embodiments, the hidden hit region of the first user interface object has a different width (e.g., maximum extent from the object) than the second user interface object. For example, in some embodiments a user interface object whose associated action is destructive, irreversible, or which may lead to a destructive or irreversible action, has a narrower hidden region (or even no hidden hit region) than a second user interface object whose associated action is not destructive or irreversible.

In some embodiments, after the finger-down event and before the finger-up event, a series of finger-dragging events are detected at positions on the touch screen display, but outside the slide control user interface object 5806's hit region 5816. In this case, the device moves the slide object 5801 along the slide bar 5803 from its current position to a different position determined at least in part by each finger-dragging event's associated position on the touch screen display. The slide object 5801 stops at a second position when the finger-up event is detected.

Figure 8:
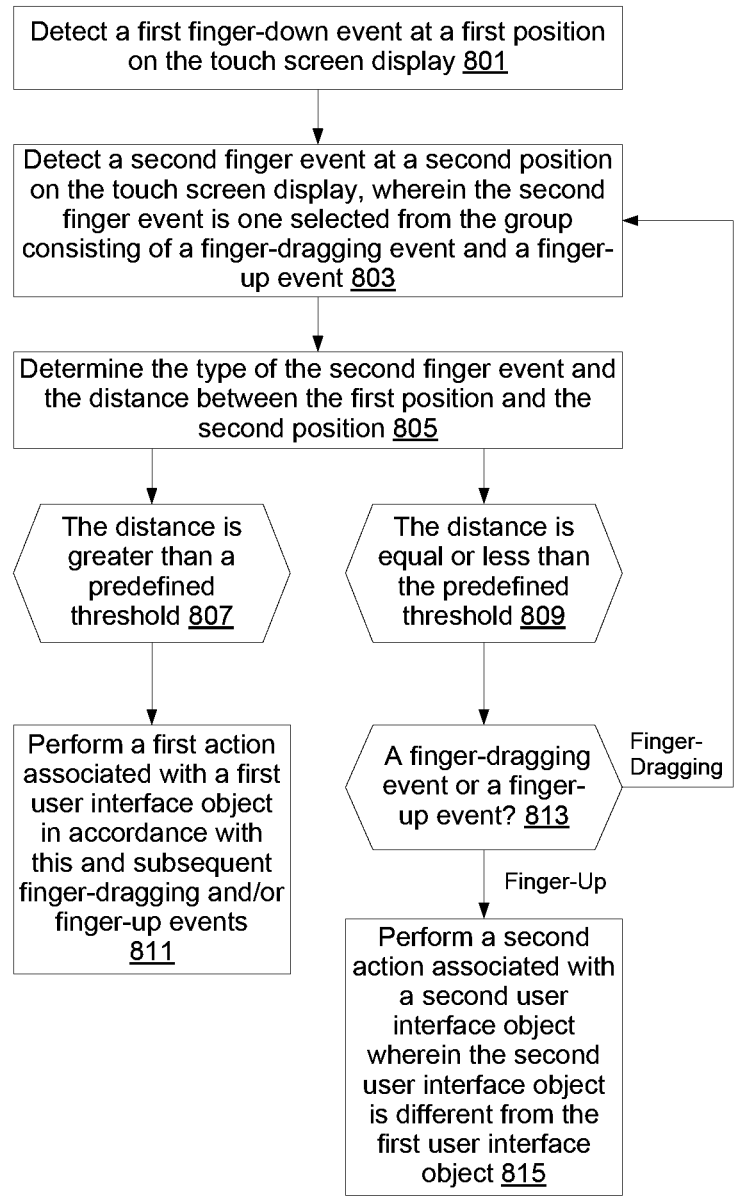
FIG. 8 is a flow diagram illustrating a process for performing a predefined action in response to a finger gesture near two adjacent user interface objects in accordance with some embodiments.
Figure 9A:
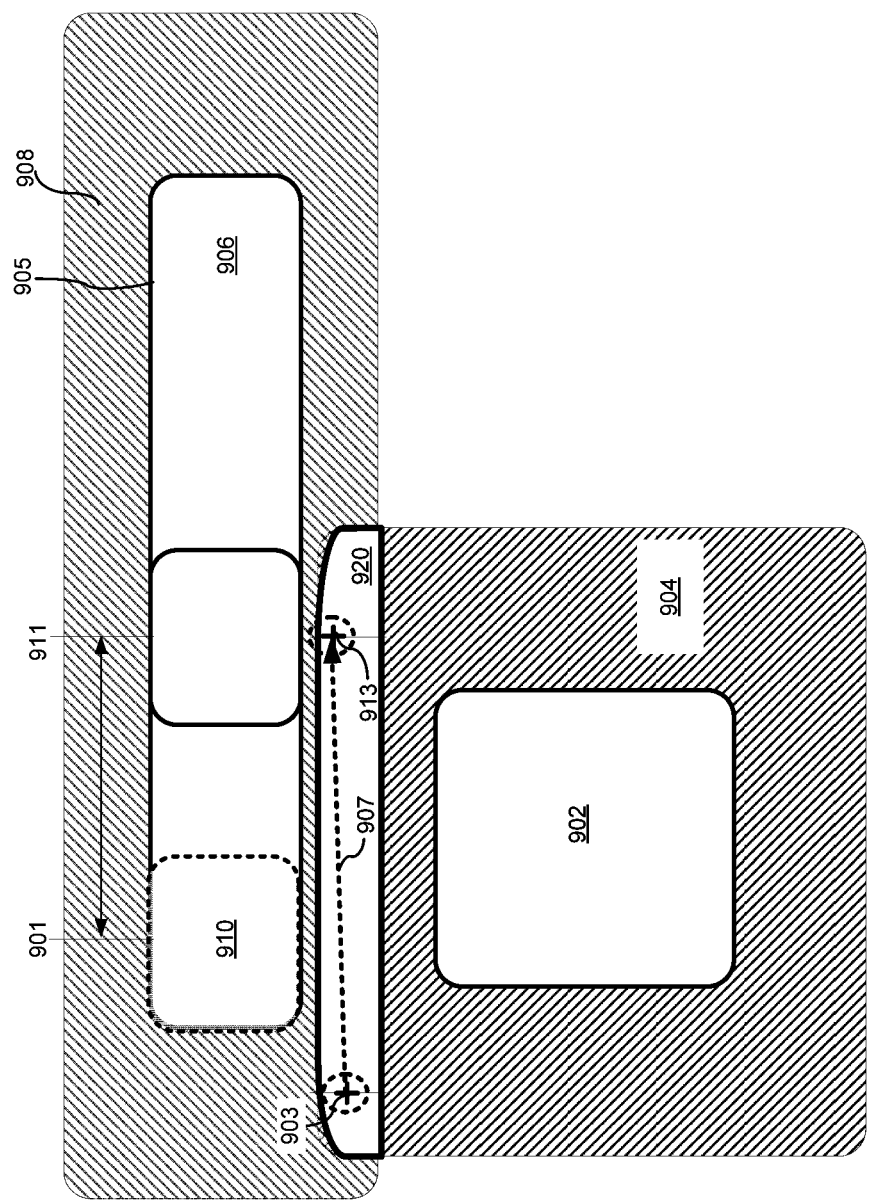
FIGS. 9A-9C are exemplary embodiments illustrating how a portable device identifies one of two adjacent user interface objects that have an overlapping hit region in response to a finger gesture that falls in the overlapping hit region and then performs a user-desired action.
Figure 9B:
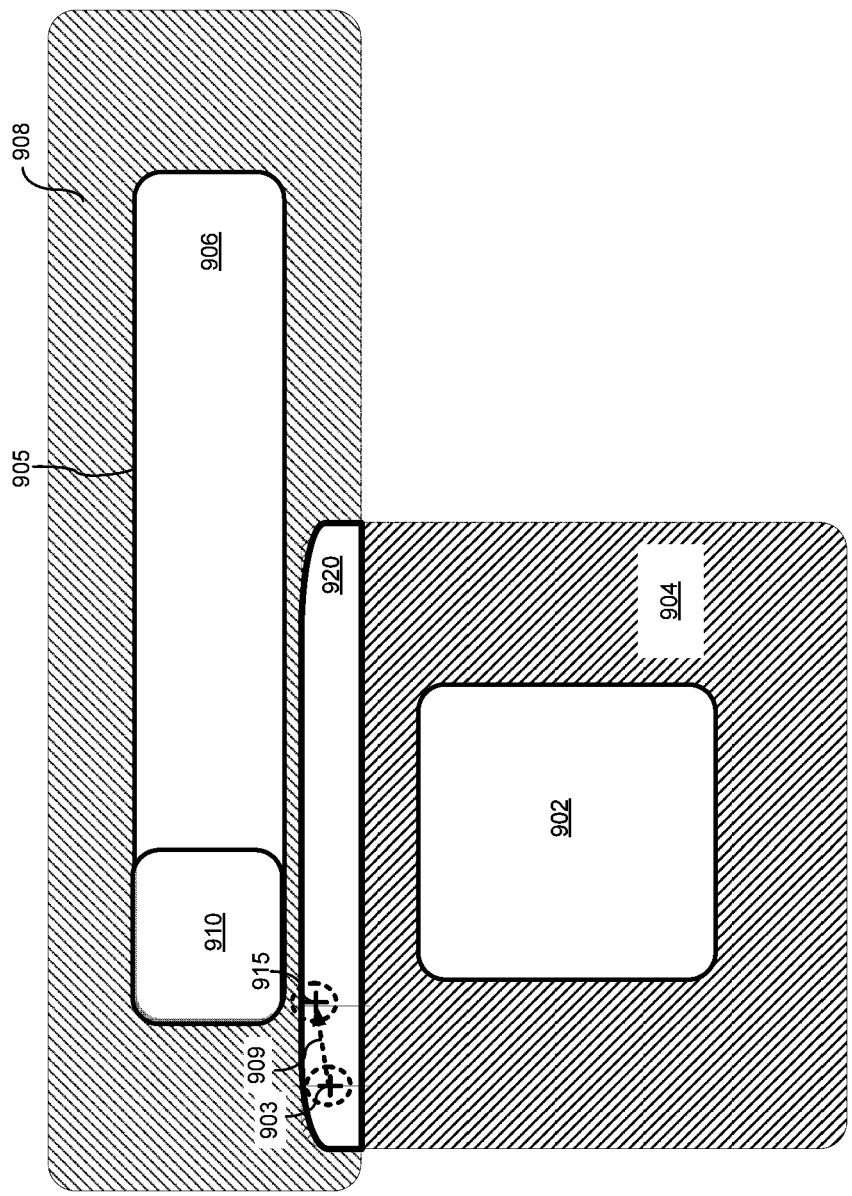
Figure 9C:
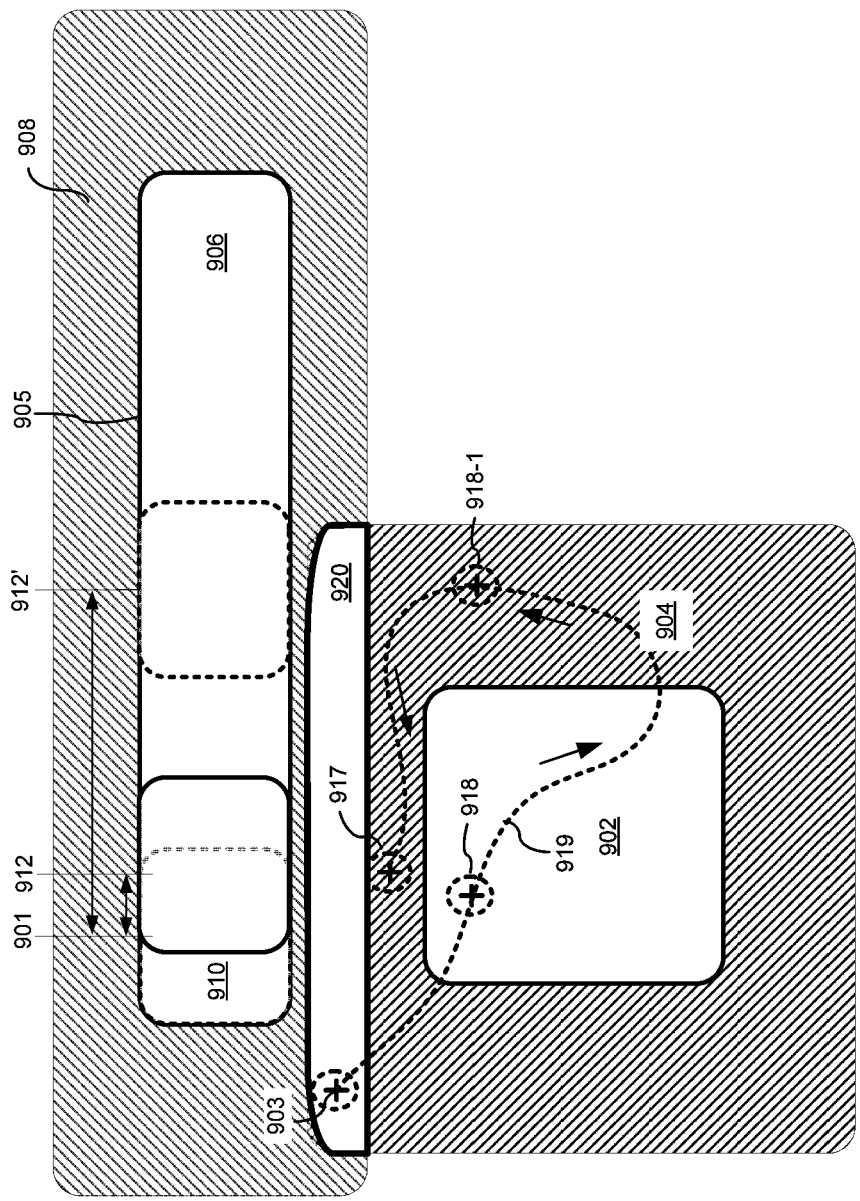

In some embodiments, the device interprets the user's actual intention associated with a finger gesture that begins in an overlapping hidden hit region between two adjacent user interface objects before the finger gesture is finished, e.g., while the finger is still in contact with the touch screen display. FIG. 8 is a flow diagram illustrating a process for performing a predefined action in response to a finger gesture near two adjacent user interface objects in accordance with some embodiments. FIGS. 9A-9C are exemplary embodiments illustrating how a portable device identifies one of two adjacent user interface objects that have an overlapping hit region in response to a finger gesture that falls in the overlapping hit region and performs a user-desired action.

FIG. 9A depicts two user interface objects, e.g., a button control user interface object 902 and a slide control user interface object 906 having a slide object 910 that is movable along a slide bar 905, on the touch screen display. In FIGS. 7A-7D, the two user interface objects are displayed side by side next to each other at the same horizontal level. In FIGS. 9A-9C, the slide control user interface object 906 is positioned above the button control user interface object. Note that the methods disclosed in this application are independent of any specific spatial arrangement of user interface objects and are equally applicable to other, e.g., vertical or diagonal, orientations of an overlapping hidden hit region between adjacent user interface objects.

The portable device detects a first finger-down event at a first position on the touch screen display (801). As shown in FIGS. 9A-9C, an exemplary finger-down event occurs at the position 903 within the overlapping hit region 920. In some embodiments, the portable device identifies user interface objects that are associated with the first finger-down position 903. As noted above, each user interface object typically has an associated hidden hit region and the object is identified if the position 903 is within the user interface object or its hidden hit region. In this example, both the button control user interface object 902 and the slide control user interface object 906 are associated with the first position 903. Because at least two user interface objects are identified, the portable device postpones activation of either object until a subsequent finger event better reveals the user's actual intention.

The portable device detects a second finger event at a second position on the touch screen display (803). In some embodiments, a finger gesture is characterized by a series of finger events, including one finger-down event in which the finger is first detected to be on or near the touch screen display, followed by zero or more finger-dragging events in which finger is detected to move from one position to another position on the touch screen display, followed by one finger-up event in which the finger is detected to be lifted off the touch screen display.

The portable device then determines the type of the second finger event and the distance between the first position and the second position (805). In some embodiments, this distance is defined as the component of a vector between the first position and the second position (e.g., 907 in FIG. 9A and 909 in FIG. 9B) along the slide direction of a slide object (e.g., the horizontal component of 907 in FIG. 9A and the horizontal component of 909 in FIG. 9B). In some embodiments, this distance is defined as the vertical component of the vector between the first position and the second position, e.g., if the slide direction of the slide control user interface object is oriented vertically (not shown). In some other embodiments, this distance is defined as the magnitude of the vector between the first position and the second position. For illustration, the distance in the present example is assumed to be the component of the vector between the first position and the second position along the slide direction of a slide object (e.g., the horizontal component of 907 in FIG. 9A and the horizontal component of 909 in FIG. 9B). Because the second finger event is detected after the detection of the first finger-down event, it is either a finger-dragging event or a finger-up event. In some embodiments, the vector between the two positions is projected onto the horizontal and vertical axes of the touch screen display. FIG. 9A depicts that the second finger event is detected at the position 913. FIG. 9B depicts that the second finger event is detected at the position 915 and the distance between the two positions in FIG. 9B is smaller than that in FIG. 9A.

Note that the type of the second finger event is independent of the distance between the two positions. A long distance as shown in FIG. 9A may indicate that the finger moves quickly from the position 903 to the position 913 before any finger-dragging event is detected and the finger may still remain in contact with the touch screen display at the position 913. A short distance as shown in FIG. 9B may suggest that the finger is lifted off the touch screen display after a brief movement and, accordingly, no finger-dragging event is detected before the finger-up event at the position 915.

If the distance between the two positions is greater than a predefined threshold (807), the device performs a first action associated with the first user interface object (811) (e.g., activating slide control user interface object 906 in FIG. 9A and moving the slide object 910 from position 901 to position 911 along the slide bar 905).

If the distance between the two positions is equal to or less than the predefined threshold (809), the device checks the type of the second finger event detected at the second position (813). If the second finger event is a finger-up event, the device then performs a second action associated with the second user interface object (815), e.g., activating button control object 902. If the second finger event is a finger-dragging event, the device performs no further action other than returning to operation 803 to detect the next finger event.

Referring now to FIG. 9A, because the distance, e.g., the horizontal component of the vector 907, is greater than a predefined threshold, which is determined heuristically and may be user-configurable, the device infers that the user intends to activate the slide control user interface object 906, e.g., to increase the audio volume if the object is used for volume control or to fast-forward a video stream if the object is used for play time control. The slide object 910 is moved along the slide bar 905 from the position 901 to the position 911. As noted above, the slide object 910 is typically moved along the slide bar 905 to a position that is determined by a projection of the second position onto the slide bar 905 until the slide object 910 reaches an end of the slide bar 905. In other words, the slide object 910 does not move beyond either end of the slide bar 905.

In the example shown in FIG. 9A, the long distance by itself is deemed to be sufficient indicia of the user's intent. The type of the second finger event at the second position becomes irrelevant and the device will not activate the button control interface object at the conclusion of the finger gesture. In other words, if the change in position between 903 and 913 exceeds the predefined threshold, the device will activate the slide control user interface object 906, not the button control user interface object 902, even if the second finger event is a finger-up event and no previous finger-dragging event was detected. The main difference between a finger-dragging event at position 913 and a finger-up event at position 913 is that the finger gesture is not deemed to be finished if the second finger event is a finger-dragging event. Thus, the slide object 910 may be moved again along the slide bar in response to detection of a subsequent finger event until a finger-up event is detected.

FIG. 9B depicts that a finger-up event is detected at the second position 915. Because the horizontal component of the vector 909 in FIG. 9B is equal to or less than the predefined threshold, the device infers that the user intends to activate the button control user interface object 902 and performs a corresponding operation, e.g., initiating a call if the object 902 is the Call button 3240 as shown in FIG. 5.

FIG. 9C is another embodiment in which the portable device activates the slide control user interface object 906. In this example, the user drags his or her finger on the touch screen display along the dashed-line curve 919, which generates a series of finger-dragging events.

As noted above in connection with FIG. 8, if the second finger event, which is a finger-dragging event, is detected at a second position and the distance between the two positions is equal to or less than the predefined threshold, the device activates neither user interface object and waits for the next finger event to occur. At some point, a finger-dragging event is detected at a position 918 and the horizontal component of the vector between position 903 and position 918 is greater than the threshold. In response, the slide control user interface object 906 is activated and the device starts moving the slide object 910 along the slide bar 905 to a new location in accordance with a projection of the detected position onto the slide bar 905. Subsequently, for each detected finger-dragging event at a new position 918-1, the device determines a horizontal component of the vector between a previous position associated with a previous finger-dragging event and the new position 918-1 and moves the slide object 910 along the slide bar 905 accordingly (e.g., to a new location 912' in FIG. 9C). This set of operations is repeated until a finger-up event is detected at a last position 917 on the touch screen display and the slide object 910 accordingly stops at the location 912 on the slide bar 905.

Note that the last position 917 associated with the finger-up event in FIG. 9C has no impact on the device's inference of the user's intention to activate the slide control user interface object 906. The slide control user interface object 906 is activated even if the last position 917 (i.e., the position at which a finger-up event is detected) is outside the hidden hit region 908 surrounding the slide control user interface object 906 and, e.g., within the hidden hit region of the non-activated user interface object (e.g., the button control user interface object 902 in FIG. 9C). The slide control user interface object 906 is activated even if the horizontal component of the vector between the first position 903 and the last position 917 is equal to or less than the predefined threshold.

In some embodiments, the second position of the finger event that activates one of multiple adjacent user interface objects with an overlapping hidden hit region can be found anywhere on the touch screen display. For example, in FIGS. 9A and 9B, the second position can even be outside the hidden hit regions of the two user interface objects as long as the first position falls within the overlapping hidden hit region 920 between the two user interface objects. The slide control user interface object 906 is activated in FIG. 9A even if the second position is outside the hidden hit region 908 surrounding the slide control user interface object 906 provided that the horizontal component of the vector between the two positions is greater than the predefined threshold. Similarly, the button control user interface object 902 is activated in FIG. 9B even if the second position at which the finger-up event is detected is outside the hidden hit region 904 surrounding the button control user interface object 902, provided that the distance between the two positions is equal to or less than the predefined threshold.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a portable electronic device with a touch screen display that displays a plurality of user interface objects:
       detecting a first finger-down event at a first position on the touch screen display, wherein:
           the first position is adjacent to a first displayed user interface object that has a first hidden hit region surrounding the first displayed user interface object, wherein the first displayed user interface object is a slide control user interface object that includes a displayed slide bar and a displayed slide object;
           the first position is adjacent to a second displayed user interface object that has a second hidden hit region surrounding the second user interface object, wherein the second displayed user interface object is a button control user interface object;
           the first displayed user interface object is different from the second displayed user interface object;
           the first hidden hit region partially overlaps the second hidden hit region in an overlapping hidden hit region; and
           the first position falls within the overlapping hidden hit region between the first displayed user interface object and the second displayed user interface object;
       detecting a second finger event at a second position on the touch screen display, wherein the second finger event is selected from the group consisting of a finger-dragging event and a finger-up event;
       determining a type of the second finger event and a distance between the first position and the second position;
       performing a first action associated with the first displayed user interface object if the distance is greater than a predefined threshold; and
       performing a second action associated with the second displayed user interface object if the distance is less than the predefined threshold and the second finger event is a finger-up event.

2. The method of claim 1, further comprising:
   detecting a next finger event at a position on the touch screen display if the distance is less than the predefined threshold and the second finger event is a finger-dragging event.

3. The method of claim 1, further comprising:
   after performing the first action,
       detecting a finger-dragging event at a new position on the touch screen display;
       determining a distance between the new position and a previous position associated with a previous finger-dragging event;
       performing another action associated with the first displayed user interface object; and
       repeating said detecting, determining, and performing operations until a finger-up event is detected at a last position on the touch screen display.

4. The method of claim 3, wherein the distance between the first position and the last position is less than the predefined threshold.

5. The method of claim 3, wherein the last position is outside the hidden hit region surrounding the first displayed user interface object.

6. The method of claim 1, wherein the second position at which the finger-up event is detected is outside the hidden hit region surrounding the second displayed user interface object.

7. The method of claim 1, wherein performing the first action includes moving the displayed slide object along the displayed slide bar to a position that is determined by a projection of the second position onto the displayed slide bar.

8. The method of claim 1, wherein performing the second action includes activating the button control user interface object.

9. A graphical user interface on a portable electronic device with a touch screen display, comprising:
   a plurality of displayed user interface objects, including a first displayed user interface object that has a hidden hit region surrounding the first displayed user interface object and a second displayed user interface object that has a second hidden hit region surrounding the second displayed user interface object displayed on the touch screen display, and an overlapping hidden hit region where the first hidden hit region partially overlaps the second hidden hit region;
   wherein the first displayed user interface object is different from the second displayed user interface object, the first displayed user interface object is a slide control user interface object that includes a displayed slide bar and a displayed slide object and the second displayed user interface object is a button control user interface object;
   wherein:
       in response to detecting:
           a first finger-down event at a first position on the touch screen display, wherein the first position is adjacent to the first displayed user interface object and the second displayed user interface object and falls within the overlapping hidden hit region between the first displayed user interface object and the second displayed user interface object; and
           a second finger event at a second position on the touch screen display, wherein the second finger event is one selected from the group consisting of a finger-dragging event and a finger-up event;
       a type of the second finger event and a distance between the first position and the second position are determined;
       a first action associated with the first displayed user interface object is performed if the distance is greater than a predefined threshold; and
       a second action associated with the second displayed user interface object is performed if the distance is less than the predefined threshold and the second finger event is a finger-up event.

10. A portable electronic device, comprising:
    a touch screen display with a plurality of displayed user interface objects;
    one or more processors;
    memory; and one or more programs, wherein the one or more programs are stored in the memory and configured to be executed by the one or more processors, the one or more programs including instructions for:

detecting a first finger-down event at a first position on the touch screen display, wherein:
   the first position is adjacent to a first displayed user interface object that has a first hidden hit region surrounding the first displayed user interface object, wherein the first displayed user interface object is a slide control user interface object that includes a displayed slide bar and a displayed slide object;
   the first position is adjacent to a second displayed user interface object that has a second hidden hit region surrounding the second displayed user interface object, wherein the second displayed user interface object is a button control user interface object;
   the first displayed user interface object is different from the second displayed user interface object;
   the first hidden hit region partially overlaps the second hidden hit region in an overlapping hidden hit region; and
   the first position falls within the overlapping hidden hit region between the first displayed user interface object and the second displayed user interface object;
   detecting a second finger event at a second position on the touch screen display, wherein the second finger event is one selected from the group consisting of a finger-dragging event and a finger-up event;
   determining a type of the second finger event and a distance between the first position and the second position;
   performing a first action associated with the first user interface object if the distance is greater than a predefined threshold; and
   performing a second action associated with the second displayed user interface object if the distance is less than the predefined threshold and the second finger event is a finger-up event.

11. The device of claim 10, the one or more programs further comprising instructions for:
   detecting a next finger event at a position on the touch screen display if the distance is less than the predefined threshold and the second finger event is a finger-dragging event.

12. The device of claim 11, wherein the distance between the first position and the last position is less than the predefined threshold.

13. The device of claim 11, wherein the last position is outside the hidden hit region surrounding the first displayed user interface object.

14. The device of claim 10, the one or more programs further comprising instructions for:
   after performing the first action,
      detecting a finger-dragging event at a new position on the touch screen display;
      determining a distance between the new position and a previous position associated with a previous finger-dragging event;
      performing another action associated with the first displayed user interface object; and
      repeating said detecting, determining, and performing operations until a finger-up event is detected at a last position on the touch screen display.

15. The device of claim 10, wherein the second position at which the finger-up event is detected is outside the hidden hit region surrounding the second displayed user interface object.

16. The device of claim 10, wherein performing the first action includes moving the displayed slide object along the displayed slide bar to a position that is determined by a projection of the second position onto the displayed slide bar.

17. The device of claim 10, wherein performing the second action includes activating the button control user interface object.

18. A non-transitory computer readable storage medium having stored therein instructions, which when executed by a portable electronic device with a touch screen display with a plurality of displayed user interface objects, cause the device to:
   detect a first finger-down event at a first position on the touch screen display, wherein:
   the first position is adjacent to a first displayed user interface object that has a first hidden hit region surrounding the first displayed user interface object, wherein the first displayed user interface object is a slide control user interface object that includes a displayed slide bar and a displayed slide object;
   the first position is adjacent to a second displayed user interface object that has a second hidden hit region surrounding the second displayed user interface object, wherein the second displayed user interface object is a button control user interface object;
   the first displayed user interface object is different from the second displayed user interface object;
   the first hidden hit region partially overlaps the second hidden hit region in an overlapping hidden hit region; and
   the first position falls within the overlapping hidden hit region between the first displayed user interface object and the second displayed user interface object;
   detect a second finger event at a second position on the touch screen display, wherein the second finger event is one selected from the group consisting of a finger-dragging event and a finger-up event;
   determine a type of the second finger event and a distance between the first position and the second position;
   perform a first action associated with the first displayed user interface object if the distance is greater than a predefined threshold; and
   perform a second action associated with the second displayed user interface object if the distance is less than the predefined threshold and the second finger event is a finger-up event.

19. The computer readable storage medium of claim 18, the one or more programs further comprising instructions which cause the device to:
   detect a next finger event at a position on the touch screen display if the distance is less than the predefined threshold and the second finger event is a finger-dragging event.

20. The computer readable storage medium of claim 19, wherein the distance between the first position and the last position is less than the predefined threshold.

21. The computer readable storage medium of claim 19, wherein the last position is outside the hidden hit region surrounding the first displayed user interface object.

22. The computer readable storage medium of claim 18, the one or more programs further comprising instructions which cause the device to:
   after performing the first action, detect a finger-dragging event at a new position on the touch screen display;

determine a distance between the new position and a previous position associated with a previous finger-dragging event;

perform another action associated with the first displayed user interface object; and repeat said detecting, determining, and performing operations until a finger-up event is detected at a last position on the touch screen display.

23. The computer readable storage medium of claim 18, wherein the second position at which the finger-up event is detected is outside the hidden hit region surrounding the second displayed user interface object.

24. The computer readable storage medium of claim 18, wherein performing the first action includes moving the displayed slide object along the displayed slide bar to a position that is determined by a projection of the second position onto the displayed slide bar.

25. The computer readable storage medium of claim 18, wherein performing the second action includes activating the button control user interface object.

\* \* \* \* \*